(12) United States Patent
Tucker et al.

(10) Patent No.: US 9,971,335 B2
(45) Date of Patent: May 15, 2018

(54) HYBRID DYNAMIC TREE DATA STRUCTURE AND ACCESSIBILITY MAPPING FOR COMPUTER NUMERICAL CONTROLLED MACHINING PATH PLANNING

(71) Applicants: Thomas Marshall Tucker, Waxhaw, NC (US); Thomas Kurfess, Clemson, SC (US); Dmytro Konobrytskyi, Long Island City, NY (US)

(72) Inventors: Thomas Marshall Tucker, Waxhaw, NC (US); Thomas Kurfess, Clemson, SC (US); Dmytro Konobrytskyi, Long Island City, NY (US)

( * ) Notice: Subject to any disclaimer, the term of this patent is extended or adjusted under 35 U.S.C. 154(b) by 327 days.

(21) Appl. No.: 14/684,499

(22) Filed: Apr. 13, 2015

(65) Prior Publication Data

US 2015/0294500 A1 Oct. 15, 2015

Related U.S. Application Data

(60) Provisional application No. 61/978,233, filed on Apr. 11, 2014.

(51) Int. Cl.
*G05B 19/19* (2006.01)
*G05B 19/4069* (2006.01)
(Continued)

(52) U.S. Cl.
CPC .............. *G05B 19/19* (2013.01); *G06T 17/00* (2013.01); *G06T 17/005* (2013.01); *G05B 2219/36342* (2013.01)

(58) Field of Classification Search
CPC .......... B23Q 3/00; B23Q 15/00; B23Q 35/08; B23Q 17/2208; G05B 19/00; G05B 19/18;
(Continued)

(56) References Cited

U.S. PATENT DOCUMENTS 4,039,067 A * 8/1977 Kashio ....................... B41J 1/44
  101/93.15
6,099,573 A * 8/2000 Xavier .................... G06T 17/00
  345/419

(Continued)

OTHER PUBLICATIONS

An article on "Rapid Octree Construction from Image Sequences" by Richard Szeliski, Published Jul. 1993.*

(Continued)

*Primary Examiner* — Nishant B Divecha
(74) *Attorney, Agent, or Firm* — McNair Law Firm, P.A.

(57) ABSTRACT

A method of modeling a solid shape in a volume of space may include segmenting the volume into a plurality of equal portions of a given first size, determining, with respect to each portion, a first fill status based on whether each respective portion includes material of the shape, segmenting selected portions of the volume, based on the first fill status, into equal portions of a given second size that is smaller than the first size, determining, with respect to each selected portion, a second fill status, segmenting second selected portions of the volume, based on the second fill status, into equal portions of a given third size that is smaller than the second size, determining, with respect to each second selected portion, a third fill status, and generating a hybrid dynamic tree data structure based on the based on the first, second and third fill statuses.

14 Claims, 8 Drawing Sheets

(51) Int. Cl.
*G06T 17/00* (2006.01)
*G06F 17/50* (2006.01)

(58) Field of Classification Search
CPC ......... G05B 19/19; G05B 19/21–19/40; G05B 19/182; G05B 19/184; G05B 19/401; G05B 19/4061; G05B 19/4093–19/40931; G05B 19/4097; G05B 19/4099; G05B 19/4155
USPC ........ 264/138, 163, 219; 382/108, 152, 154, 382/164, 171, 173–179, 285–286; 378/4–21; 434/82, 267, 270, 274; 700/160, 186, 187, 178, 190–191
See application file for complete search history.

(56) References Cited

U.S. PATENT DOCUMENTS

| | | | | |
|---|---|---|---|---|
| 6,311,100 | B1* | 10/2001 | Sarma | G05B 19/4097 700/186 |
| 6,535,794 | B1* | 3/2003 | Raab | B25J 9/1692 33/502 |
| 6,885,909 | B2* | 4/2005 | Isohata | G05B 19/4142 700/160 |
| 9,122,270 | B2* | 9/2015 | Sullivan | G05B 19/4069 |
| 2015/0039122 | A1* | 2/2015 | Barakchi Fard | G06F 17/5009 700/186 |
| 2016/0188770 | A1* | 6/2016 | Montana | G06F 17/5009 700/97 |

OTHER PUBLICATIONS

An article on "Array data structure" published Apr. 2, 2013.*
A White Paper on "OpenGL Insight" by Cozzi et al, Published Jul. 1, 2012.*
A white paper on "Rapid Prototyping through Octree decomposition of 3D Geometric models" Medellin et al., Published on Jan. 2004.*
A whitepaper on "Octree Approach for Simulation of Additive Manufacturing Toolpath" by Dhaveji et al., Published on Aug. 10, 2011.*
A whitepaper on "ARTS: Accelerated Ray-Tracing System" by Fujimoto et al., Published on Apr. 1986.*

* cited by examiner

HYBRID DYNAMIC TREE DATA STRUCTURE AND ACCESSIBILITY MAPPING FOR COMPUTER NUMERICAL CONTROLLED MACHINING PATH PLANNING

CROSS-REFERENCE TO RELATED APPLICATIONS

This application claims the benefit of U.S. Provisional Application No. 61/978,233 filed on Apr. 11, 2014, the entire contents of which are hereby incorporated herein by reference.

TECHNICAL FIELD

Example embodiments generally relate to techniques for modeling complex solid shapes using a computer and digitally determining the orientation of a cutting tool in a computer numerical controlled (CNC) machine tool to generate acceptable cutting tool paths.

BACKGROUND

During the last century, the manufacturing industry has moved from pure manual or simple mechanically automated production of goods to a new level where almost everything is controlled by electronic control systems and computers. Although areas like assembling or repairing are still done mostly by people, it is almost impossible to see large scale manual mechanical processing today mainly due to the requirements of precision, repeatability and speed. In order to meet the increasing requirements of produced components, the way of controlling machine tools evolved from manual operation to mechanical control systems during 19th century, then to Numerical Control (NC) systems in the middle of 20th century and finally to Computer Numerical Control (CNC) systems.

Modern CNC machines are extremely versatile in their ability to make parts with complex geometry and good surface quality. However, efficient usage of all machine capabilities requires highly experienced personnel and a relatively long time to program. The main reason it requires tremendous time investments is a lack of efficient and flexible automatic path planning algorithms and, as a result, a lack of reliable, fast and fully automatic software for CNC programming. Existing algorithms are usually limited to specific problem solutions due to the geometric and computational complexity of path planning. In addition, existing algorithms cannot be run efficiently on modern, highly parallel hardware for utilization of modern computing capacity and as a result are limited to performance of traditional serial processors.

To improve upon this situation, it is desirable to provide a data structure and algorithm to improve modeling and digital representation of complex solid shapes for use in a CNC machining process. In addition, it is desirable to generate cutting tool paths for CNC machine tools utilizing improved knowledge of valid orientation angles relative to a particular surface geometry.

BRIEF SUMMARY OF SOME EXAMPLES

Embodiments of the present invention may relate to techniques for modeling complex solid shapes using a computer and generating cutting tool paths for CNC machine tools that maintain the tool position and orientation such that unwanted removal of material is prevented. In this regard, a geometric representation of a solid shape is first modeled using a hybrid dynamic tree data structure. This data structure minimizes memory usage, enables simple scaling of the model, and represents volumes in an efficient manner ideal for parallel processing on graphical processing units (GPUs). Once the solid object is represented using the hybrid dynamic tree data structure, an algorithm based on accessibility mapping of the object is used to determine the cutting tool path and orientation. The algorithm is well suited for parallel processing and allows for optimizing the cutting path while prevented unwanted collisions between the material and the cutting tool.

Some example embodiments provide a method of (and/or processing circuitry of an apparatus configured for) modeling a solid shape in a volume of space. The method may include segmenting the volume into a plurality of equal portions of a given first size, determining, with respect to each portion, a first fill status based on whether each respective portion includes material of the shape, segmenting selected portions of the volume, based on the first fill status, into equal portions of a given second size that is smaller than the first size, determining, with respect to each selected portion, a second fill status, segmenting second selected portions of the volume, based on the second fill status, into equal portions of a given third size that is smaller than the second size, determining, with respect to each second selected portion, a third fill status, and generating a hybrid dynamic tree data structure based on the based on the first, second and third fill statuses.

In another example embodiment, a method for generating a cutting tool path for a computer numerically controlled machine cutting tool is provided. The method may include defining an accessibility map which defines, for a given cutting tool location, acceptable orientations of the cutting tool, and employing the accessibility map to guide the cutting tool based on a determination of acceptable orientations of the cutting tool as a discrete function of fixed orientations.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 6:
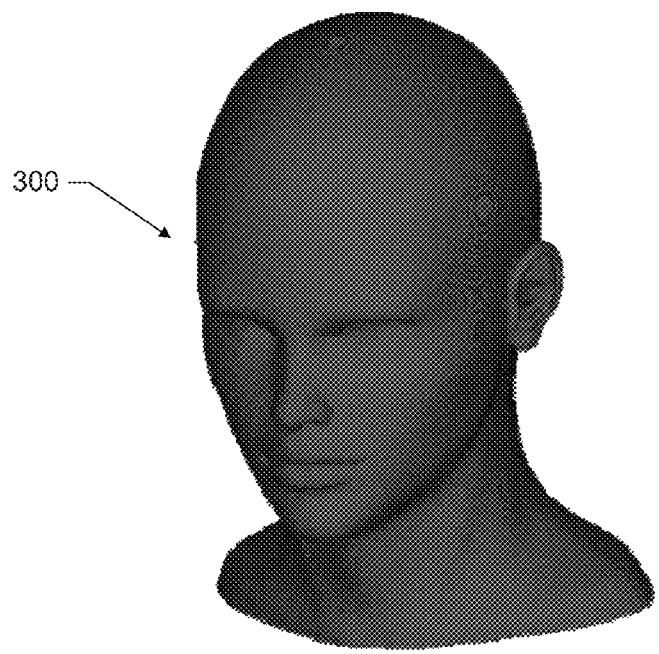
FIG. 6 illustrates a complex shape that may be modeled according to an example embodiment.
Figure 7A:
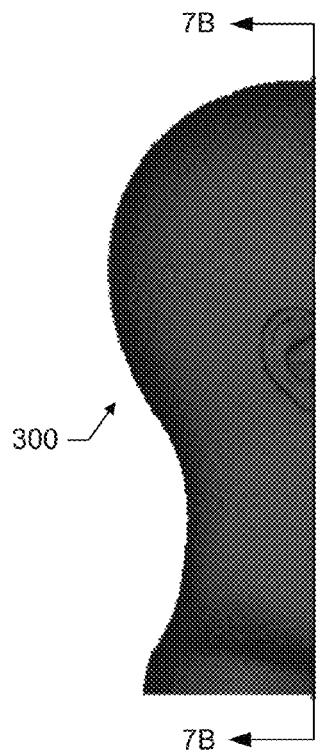
Figure 7B:
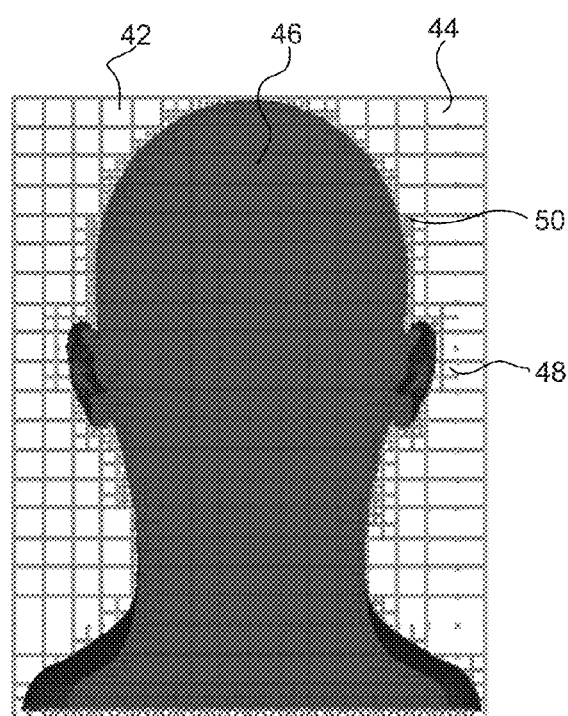
Figure 8:
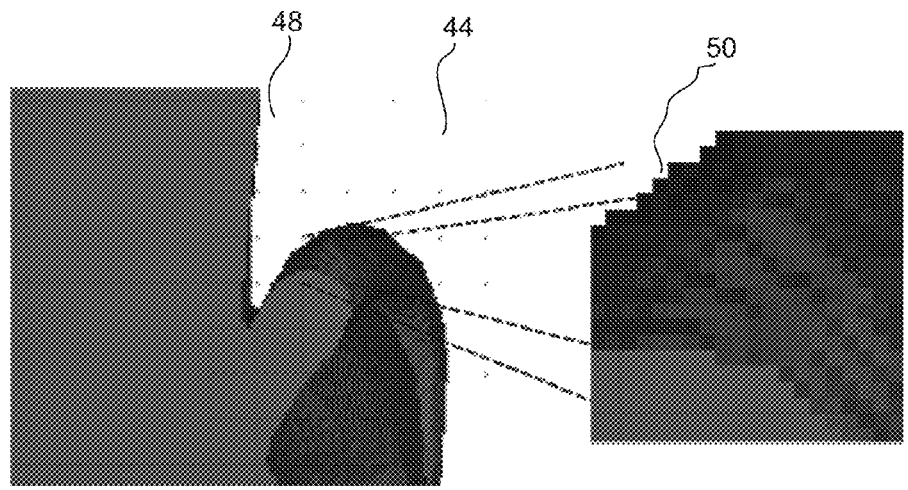
Figure 9:
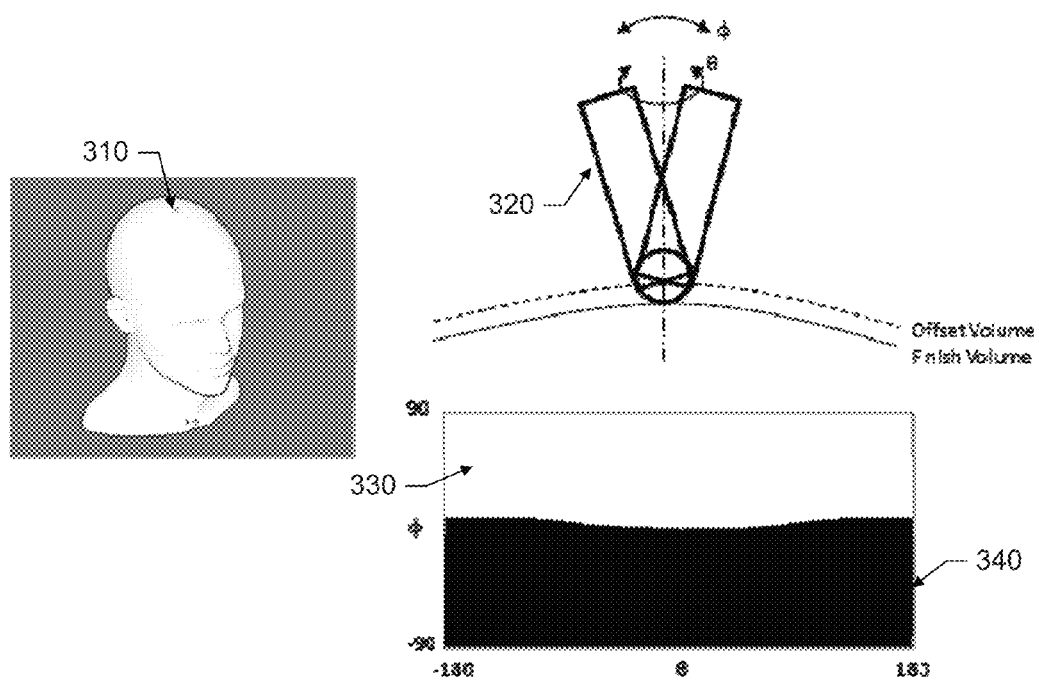
Figure 10:
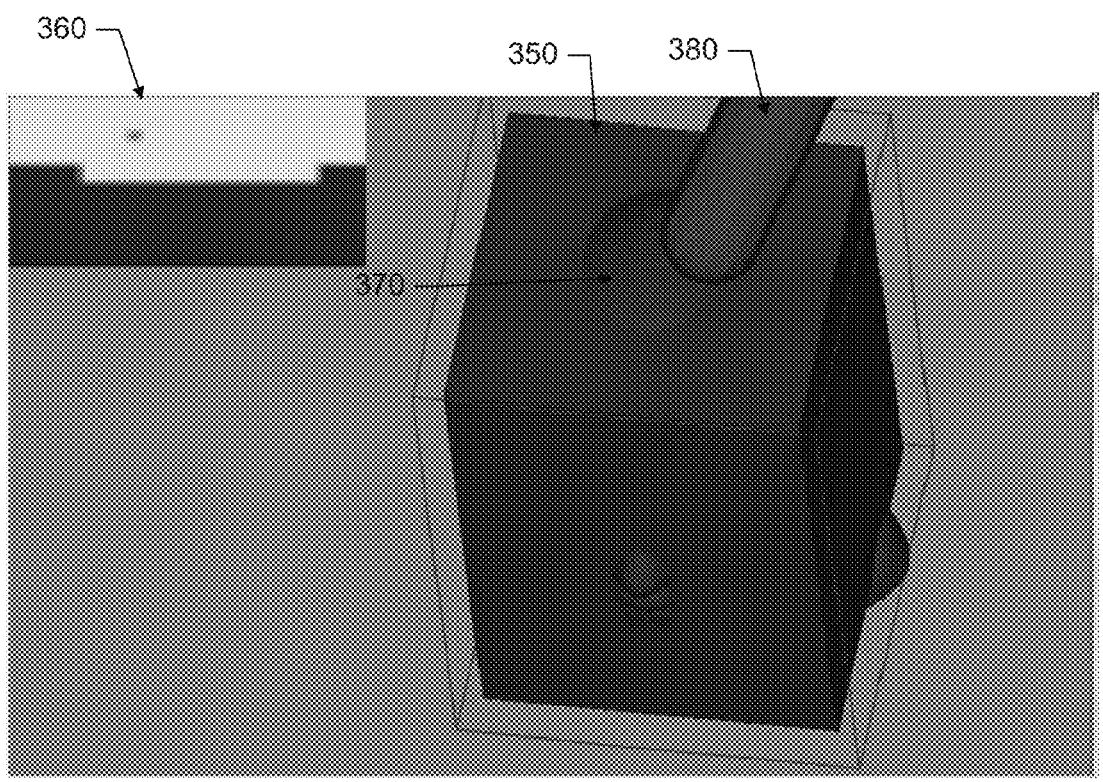
Figure 11:
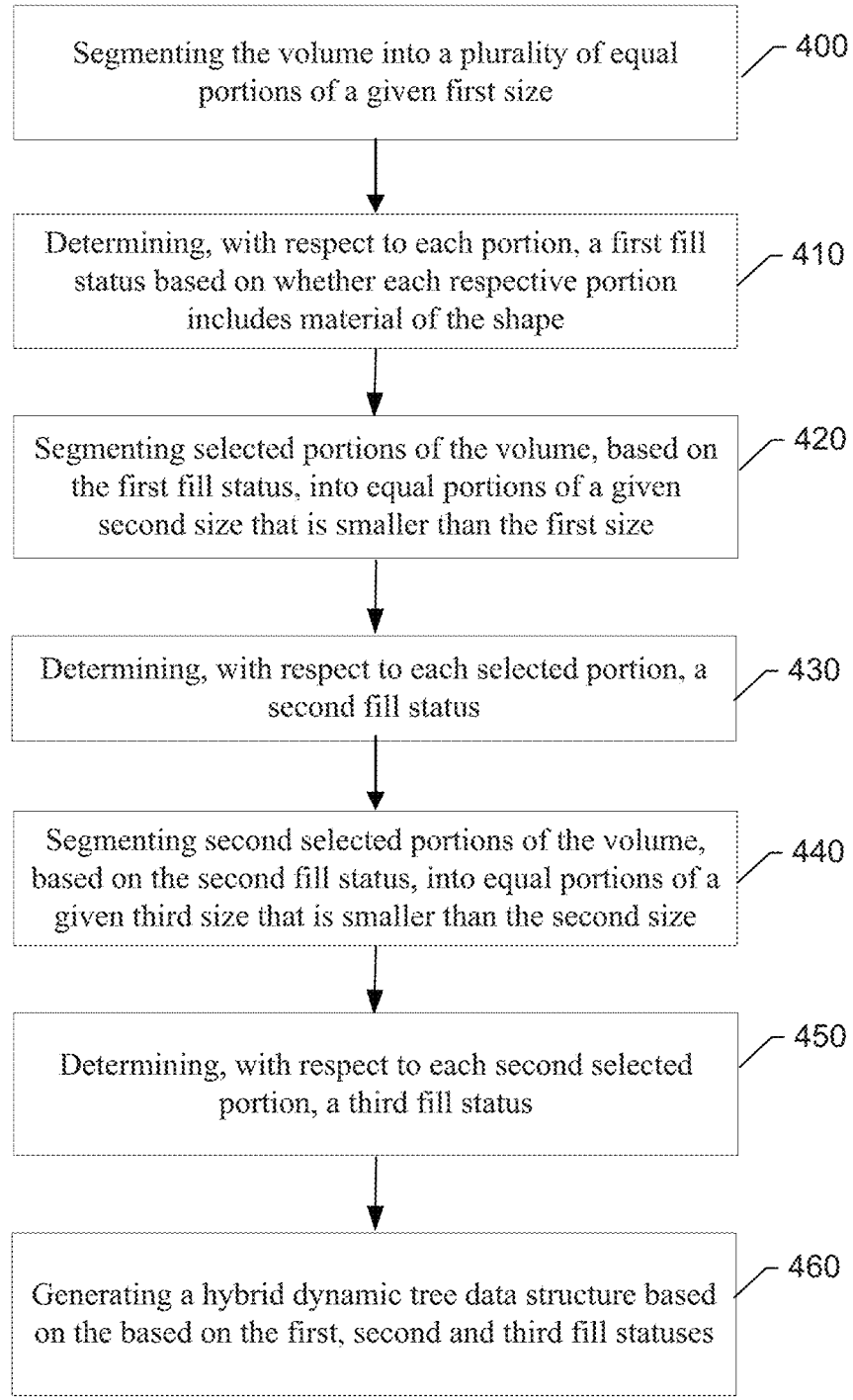
Figure 12:
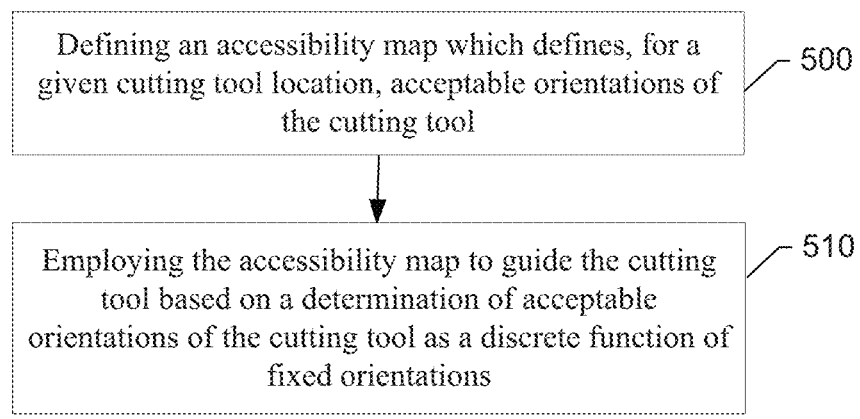

FIG. 7A identifies a cross-section of the complex shape of FIG. 6;

FIG. 7B illustrates a cross section of the complex shape of FIG. 6 divided into cells and subcells in accordance with an example embodiment;

FIG. 8 shows a close-up view of the boundary state cube from FIG. 7B in cross-section;

FIG. 9 illustrates a cutting tool and associated accessibility map in accordance with an example embodiment;

FIG. 10 shows 3D graphical representation of a cutting tool positioned relative to a solid object to be machined along with its associated accessibility map in accordance with an example embodiment;

FIG. 11 illustrates a method for modeling solid shapes occupying a volume of space according to an example embodiment; and FIG. 12 illustrates a method for generating a cutting tool path for a computer numerically controlled machine cutting tool according to an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

As indicated above, some embodiments of the present invention may relate to techniques for modeling complex solid shapes using a computer and generating cutting tool paths for CNC machine tools that maintain the tool position and orientation such that unwanted removal of material is prevented. In this regard, a geometric representation of a solid shape is first modeled using a hybrid dynamic tree data structure. This data structure minimizes memory usage, enables simple scaling of the model, and represents volumes in an efficient manner ideal for parallel processing on graphical processing units (GPUs). Once the solid object is represented using the hybrid dynamic tree data structure, an algorithm based on accessibility mapping of the object is used to determine the cutting tool path and orientation. The algorithm is well suited for parallel processing and allows for optimizing the cutting path while prevented unwanted collisions between the material and the cutting tool.

Figure 1:
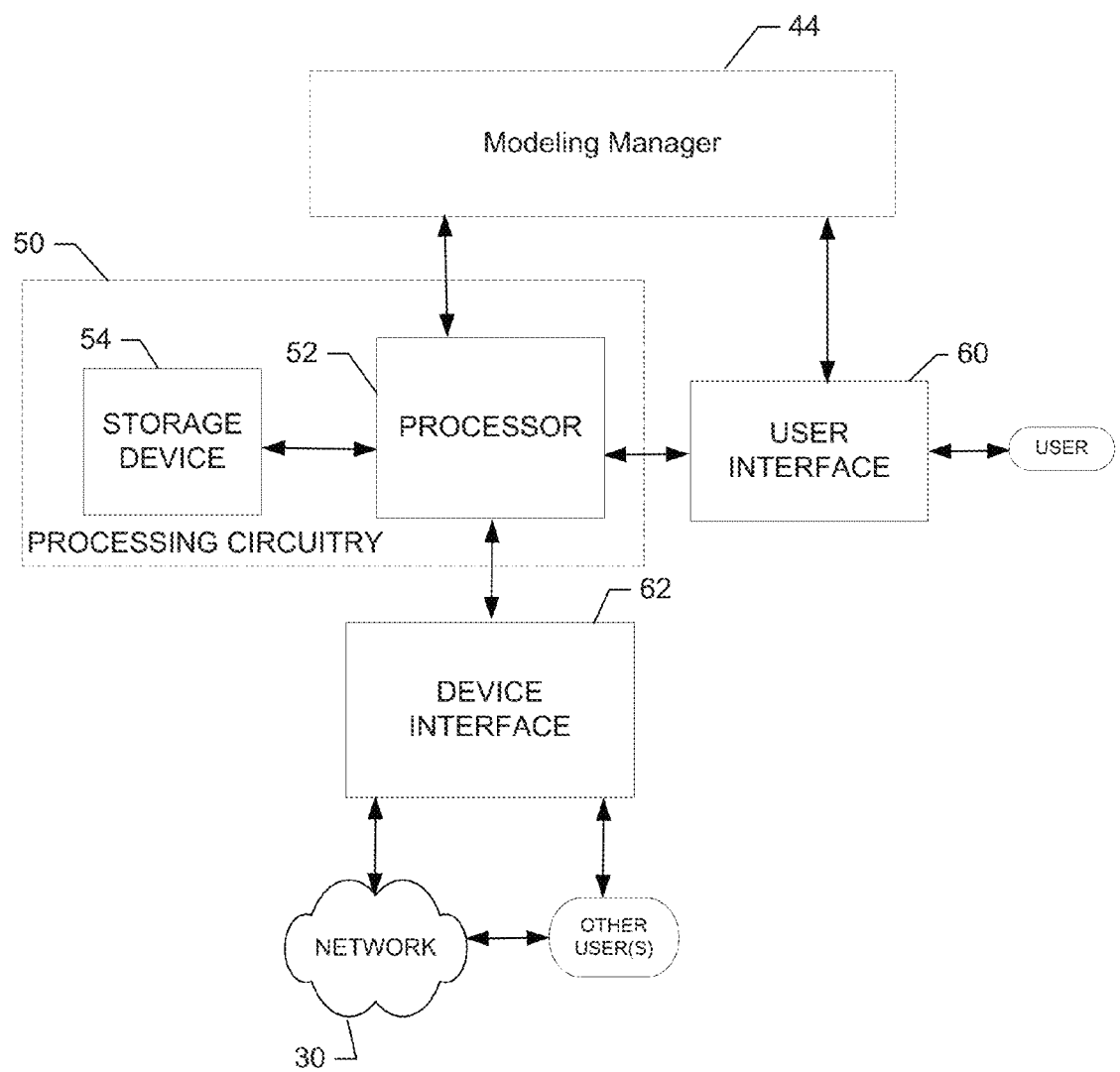
FIG. 1 illustrates a functional block diagram of a system that may be useful in connection with CNC tool path planning according to an example embodiment.
Figure 2:
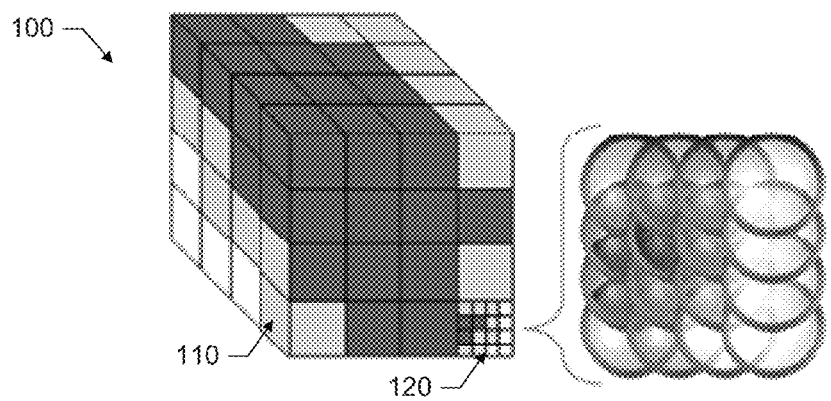
FIG. 2 illustrates a 3-dimensional view of a volumetric data structure in accordance with an embodiment of the present invention.

An example embodiment of the invention will now be described with reference to FIG. 1, which shows certain elements of an apparatus for CNC tool path planning described herein according to an example embodiment. The apparatus may be employed, for example, on a device such as, for example, a network device, server, proxy, or the like at which the modeling manager 44 may be instantiated. However, it should be appreciated that the modeling manager 44 could be a standalone device that need not be a part of a server or a server network. In some embodiments, for example, the modeling manager 44 may be instantiated on an application server and comprise stored instructions for handling activities associated with practicing example embodiments as described herein. Alternatively, embodiments may be employed on a combination of devices. Accordingly, some embodiments of the present invention may be embodied wholly at a single device or in a distributed environment (e.g., at a plurality of servers on a server network). Furthermore, it should be noted that the devices or elements described below may not be mandatory and thus some may be omitted in certain embodiments. In some cases, the modeling manager 44 may be employed to facilitate CNC tool path planning.

The apparatus may be an embodiment of the modeling manager 44 or a device hosting the modeling manager 44. As such, configuration of the apparatus as described herein may transform the apparatus into the modeling manager 44. In an example embodiment, the apparatus may include or otherwise be in communication with processing circuitry 50 that is configured to perform data processing, application execution and other processing and management services according to an example embodiment of the present invention. In one embodiment, the processing circuitry 50 may include a storage device 54 and a processor 52 that may be in communication with or otherwise control a user interface 60 (which may be optional) and a device interface 62. As such, the processing circuitry 50 may be embodied as a circuit chip (e.g., an integrated circuit chip) configured (e.g., with hardware, software or a combination of hardware and software) to perform operations described herein. However, in some embodiments, the processing circuitry 50 may be embodied as a portion of a server, computer, laptop, workstation or even one of various mobile computing devices. In situations where the processing circuitry 50 is embodied as a server or at a remotely located computing device, the user interface 60 (if employed at all) may be disposed at another device (e.g., at a computer terminal or client device such as one of the clients 20) that may be in communication with the processing circuitry 50 via the device interface 62 and/or a network (e.g., network 30).

The user interface 60 (if employed) may be in communication with the processing circuitry 50 to receive an indication of a user input at the user interface 60 and/or to provide an audible, visual, mechanical or other output to the user. As such, the user interface 60 may include, for example, a keyboard, a mouse, a joystick, a display, a touch screen, a microphone, a speaker, a cell phone, or other input/output mechanisms. In embodiments where the apparatus is embodied at a server or other network entity, the user interface 60 may be limited or even eliminated in some cases. Alternatively, as indicated above, the user interface 60 may be remotely located.

The device interface 62 may include one or more interface mechanisms for enabling communication with other devices and/or networks. In some cases, the device interface 62 may be any means such as a device or circuitry embodied in either hardware, software, or a combination of hardware and software that is configured to receive and/or transmit data from/to a network and/or any other device or module in communication with the processing circuitry 50. In this regard, the device interface 62 may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. In situations where the device interface 62 communicates with a network, the network may be any of various examples of wireless or wired communication networks such as, for example, data networks like a Local Area Network (LAN), a Metropolitan Area Network (MAN), and/or a Wide Area Network (WAN), such as the Internet.

In an example embodiment, the storage device 54 may include one or more non-transitory storage or memory devices such as, for example, volatile and/or non-volatile memory that may be either fixed or removable. The storage device 54 may be configured to store information, data, applications, instructions or the like for enabling the apparatus to carry out various functions in accordance with example embodiments of the present invention. For example, the storage device 54 could be configured to buffer input data for processing by the processor 52. Additionally or alternatively, the storage device 54 could be configured to store instructions for execution by the processor 52. As yet another alternative, the storage device 54 may include one of a plurality of databases (e.g., database server 42) that may store a variety of files, contents or data sets. Among the contents of the storage device 54, applications (e.g., client application 22 or service application 42) may be stored for execution by the processor 52 in order to carry out the functionality associated with each respective application.

The processor 52 may be embodied in a number of different ways. For example, the processor 52 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an example embodiment, the processor 52 may be configured to execute instructions stored in the storage device 54 or otherwise accessible to the processor 52. As such, whether configured by hardware or software methods, or by a combination thereof, the processor 52 may represent an entity (e.g., physically embodied in circuitry) capable of performing operations according to embodiments of the present invention while configured accordingly. Thus, for example, when the processor 52 is embodied as an ASIC, FPGA or the like, the processor 52 may be specifically configured hardware for conducting the operations described herein. Alternatively, as another example, when the processor 52 is embodied as an executor of software instructions, the instructions may specifically configure the processor 52 to perform the operations described herein.

In an example embodiment, the processor 52 (or the processing circuitry 50) may be embodied as, include or otherwise control the modeling manager 44, which may be any means such as a device or circuitry operating in accordance with software or otherwise embodied in hardware or a combination of hardware and software (e.g., processor 52 operating under software control, the processor 52 embodied as an ASIC or FPGA specifically configured to perform the operations described herein, or a combination thereof) thereby configuring the device or circuitry to perform the corresponding functions of the modeling manager 44 as described below.

An example operating scenario in which the modeling manager 44 may perform an example embodiment will now be described in reference to FIGS. 2-12. In this regard, an apparatus and method for machining objects using a CNC machine and tooling is provided. The first step in designing tool cutting paths is modeling the object using a computer. In this regard, described below is a method of modeling complex solid shapes by representing volumes of geometry digitally and in an efficient manner for parallel processing available on graphical processing units. As opposed to a traditional analytical geometry representation, the new designed geometry representation is based on discretized geometry representation approach that addresses some of the important issues related to traditional geometry models. The developed data structure and algorithms may successfully run on highly parallel hardware such as GPU and the developed system has great scalability and shows almost linear performance improvement by using multiple GPUs. Another important benefit that comes from its discrete nature is the simplicity of algorithms and absence of the requirement to describe all possible special cases and their combinations.

Existing geometry representation approaches provide a wide range of tradeoffs between accuracy, memory usage, parallelizability and scalability but do not offer a perfect choice for GPU-computing. As a result, a new, specially designed geometry representation and a corresponding data structure that can be used for the 5-axis CNC milling simulation the tool path planning process is provided below. The model has the ability to represent any possible geometry with high precision and without topological limitations while using a reasonable amount of memory. From the parallel processing point of view, the underlying data structure provides an ability to render and edit geometry in parallel with a high level of parallelism without significant synchronization overhead. From a scalability point of view, the model may be split between multiple devices with very limited communication channels.

One of the simplest volumetric geometry representations is the voxel model, which subdivides an entire volume into a 3-dimensional grid of independent elements called voxels. Each voxel has a value that may represent some properties of that area of volume such as distance to the closest surface, amount of material or simply a presence of material. The most important voxels property from the general purpose GPU (GPGPU) point of view is their independence. It means that each voxel can be processed completely independent from other voxels and it can be done in parallel on multiple devices. Another important property of the traditional voxel model is the fact that a volume is sampled regularly. It means that there is a constant predefined number of voxels for a given volume and a given resolution. And it results in very simple memory management. Although the voxel model looks like a perfect choice for GPGPU computing, since it has both parallelizability and scalability, the amount of memory required for storing the voxel model is proportional to a third power of the model resolution. In the absence of additional algorithms that can address memory storage issues, this characteristic of the voxel model is undesirable for precision tool path planning.

In contrast to the regularly sampled voxel model, that provides perfect parallelizability and scalability, there is a class of irregular sampling volume representation approaches. Usually irregularly sampled approaches are represented by trees such as the octree with constant cells ratio or the k-d tree with a variable cells ratio. An octree is a tree data structure in which each internal node has eight children. Irregularly sampled models provide a tradeoff between memory requirements, parallelizability, and complexity of a memory management process. They need much less memory than the traditional voxel model, but a tree processing is usually implemented by recursion algorithms which are not well suitable for GPU processing since GPU kernels cannot launch other kernels (this feature is not available in GPUs currently available on the market at least). Tree processing on GPU is a tradeoff between the number of kernel launches (which is equal to a tree height) and the overhead required for launching each kernel and work planning. On one hand higher (or deeper) trees provide better resources usage and may provide higher accuracy and on another hand every additional level requires another kernel launch and jobs planning time.

An additional problem of all tree based algorithms is the memory management. In the case of CPU processing, there is virtually no significant memory allocation or releasing penalty, and every thread can manage its memory independently. But there is no such natural mechanism for GPU and the implementation of a memory management system can significantly increase an algorithm complexity, and add extra performance penalties. Although irregularly sampled volume representations have significant drawbacks related to GPU computing, and their implementation itself is not trivial, it is important to note that they still provide a high level of parallelizability and scalability. It means that an irregularly sampled volume represented by a tree can be a good starting point for designing a data structure for GPGPU accelerated simulation and tool path planning but there are additional changes required since available implementations cannot be efficiently ported to GPU.

Volumetric approaches are better suited for parallel processing than surface based approaches, mainly because of independence of volume elements which can be processed independently and predictability of a workload. It is also more natural for the milling simulation to represent a volume since the actual physical process is the volume removing process. It is also obvious that the regularly sampled volumetric approach (such as the voxel model) cannot be used due to memory requirement, and that there is a need for an irregularly sampled representation. However even irregularly sampled tree-based representations have memory requirements beyond that which modern personal computers can store and process in a reasonable time. It also means that the available volumetric geometry representations will always have a limited precision in comparison to the actual machine precision. From one side it may look like it is a fundamental limitation that cannot be overcome. But from another side there are not so many use cases with a real need of the extremely high accuracy. It may be more efficient to use data structures with lower accuracy and some workarounds for these special cases.

After accepting the fact of accuracy limitation for volumetric data representations, the next step is to make a decision about the tradeoff between memory usage, accuracy and parallelizability. There are two main relations between these parameters. First, more complicated data structures provide higher accuracy for a given amount of memory. Second, deeper trees provide more efficient memory usage for a given accuracy. Relatively complicated data structure with non-predictable density such as k-d trees are less suitable for this research due to GPGPU specific load balancing (the problem similar to the BREP) and editing problems. Although generally they provide higher efficiency, their processing algorithms are more complicated, often have non-linear memory access patterns and have a higher branch divergence. These properties result in significant performance penalties on modern GPUs. As a result, it is possible to note that considering the existing GPU architectures the designed data structure has to be as simple as possible. One of the simplest possible tree-based volumetric representations is a tree with nodes where each node represents a regularly sampled volume and a list of references to its children. The octree is a classic example of this type of geometry representations with 8 children per node.

An important step is the selection of a number of children and amount of geometrical data stored in each tree node. It is easy to see that a higher children number reduces memory usage efficiency (in an extreme case a tree becomes a voxel model) and a tree depth for a given accuracy. But it is also important that a geometry processing can be efficiently parallelized by processing each child of a node concurrently. Memory access is more efficient by storing children data in a continuous memory block which can be read linearly in one memory access operation. Considering the amount of geometrical data stored in a node it is possible to say that more data approximates geometry better but uses more memory. On one side of this tradeoff, each node contains a complete mathematical description of all geometry elements. And on the other side, it is possible to use only one bit to store information about presence of material in a nodes volume (or store a byte that describes a distance to a surface or material density as it is done in the traditional voxel model). Complete geometry description requires using complex algorithms and complicated memory management since it is not possible to predict a content of a node after editing. The opposite approach is actually much more GPU-friendly because the amount of data is constant, geometry processing algorithm is much simpler and all nodes use exactly the same geometry processing algorithm.

Based on the described tradeoffs, a volumetric data structure for the GPGPU accelerated multi-axis CNC milling simulation and the tool path planning is provided. A 3-dimensional view of a volumetric data structure in accordance with an embodiment of the present invention is provided in FIG. 2. The developed geometry representation is a 2-level hybrid of the tree and the voxel model. It uses a 3d array of cells that represents a regularly sampled volume 100. Each cell 110 stores 2 bits of geometrical data (similar to voxel model) and a pointer to an array of 4096 children (similar to a tree). Cells children 120 (called "subcell") represent a regularly sampled (16×16×16) volume and store 2 bits of geometrical data but do not store pointers to their children. 2 bits geometrical data is used for 3-color scheme for geometry representation. They represent 3 possible states of a cell or subcell: (1) the cell is completely filled by material; (2) the cell is completely empty; and (3) the cell state is unknown and it probably contains a boundary. Notably, in contrast to traditional cubical voxels, cells or subcells represent spheres circumscribed around traditional cubes calculated by volume subdivision.

Figure 3:
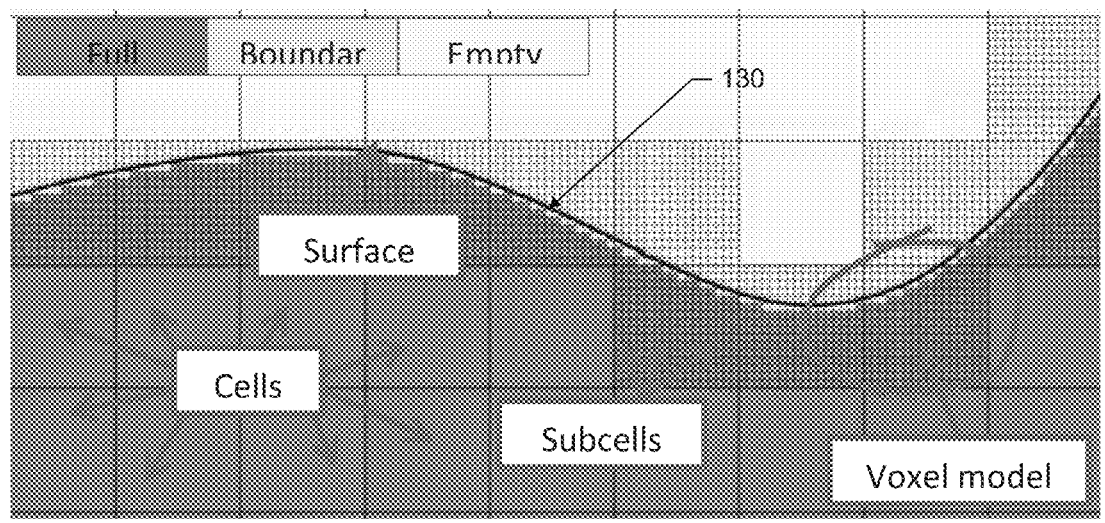
FIG. 3 illustrates a surface representation example with the 2D version of the described geometry representation according to an example embodiment.
Figure 4:
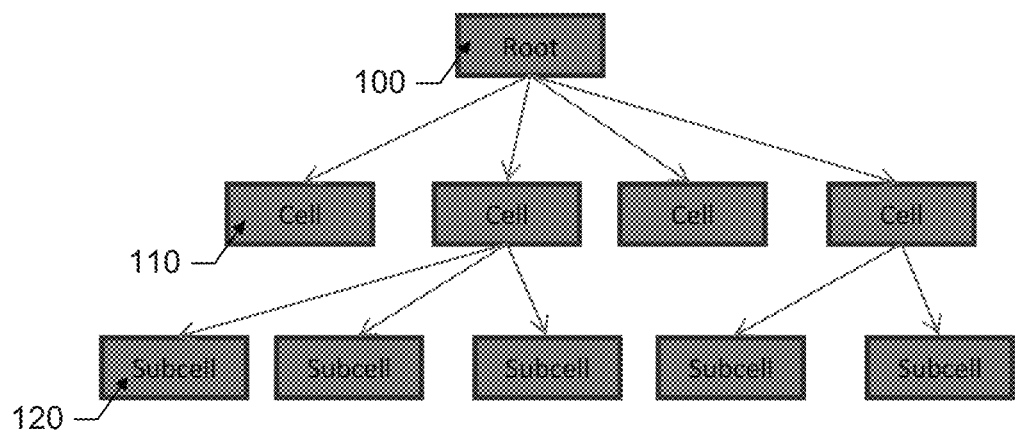
FIG. 4 is a general view of the hierarchical structure of the hybrid dynamic tree data structure in accordance with an example embodiment.
Figure 5:
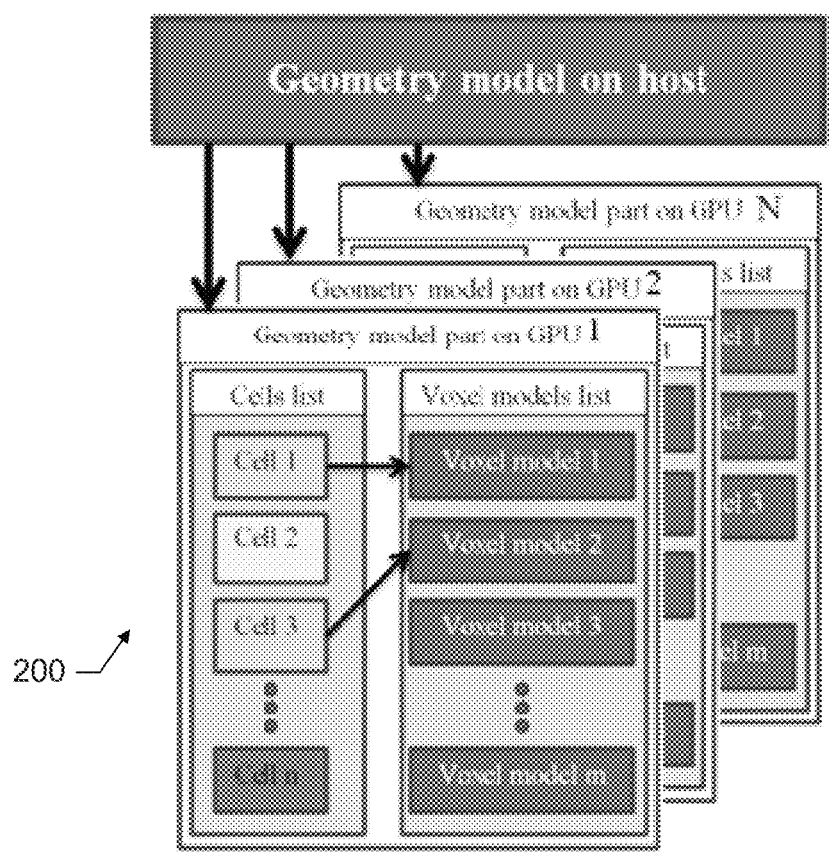
FIG. 5 is a graphical representation of memory storage of the geometrical representation according to an example embodiment.

FIG. 3 demonstrates a surface representation 130 example with the 2D version of the described geometry representation and square cells. From a hierarchical point of view, the volume representation shown in FIG. 3 can be viewed as a 2 level tree as shown in FIG. 4. It is important the low level nodes that represent subcells are stored in voxel models. But information about high level nodes is stored in a list. As result, links between nodes are not really stored anywhere as it is done in traditional trees but the model still has a tree like hierarchy. First level links are represented by indexes in a cells list and second level links are represented by indexes in voxel models. This approach allows saving a significant amount of memory relative to a traditional linked tree based approach. In addition, from a memory point of view, the developed model 200 looks like the diagram shown in FIG. 5.

The rationale behind the selected design is an attempt to combine parallelizability and scalability of the voxel model and memory efficiency of tree based geometry representations. The 2-level design provides much better memory efficiency than the voxel model has little affect on performance. With a high enough number of children all their data are stored in continuous 1 KB blocks of memory that can be efficiently read. The reason for the selection of the 2 bit geometry representation and spherical cells is an attempt to use as simple as possible geometry processing algorithms with the lowest number of branches. The 2-bit data structure also allows increasing resolution almost twice with the same memory usage in opposite to the traditional voxel model (1 byte per voxel). The used design also achieves great scalability. Since all cells are completely independent they are stored on multiple GPUs (and possibly on multiple computers) and processed independently with the almost linear performance improvement.

The implementation of the developed geometry representation model (called Hybrid Dynamic Tree or HDT) contains 3 main parts: array of cells, pool of subcells and a memory map. In contrast to a traditional voxel model, which stores all cells information in a 3d array, the HDT uses a constant length list (implemented as 1d array) where every element contains coordinates of a cell, cell value and a reference to a subcells node. This method of storing data improves data structure scalability. During a data structure initialization time an entire space that has to be represented is regularly subdivided into cells as it is done in a voxel model. Then, based on the number of computing devices (in the current implementation, GPUs), each cell is randomly mapped to a specific device and the generated map is stored for using during initialization of other data structures on the same computer. Random mapping with uniform distribution guaranties that every device gets a reasonable equal amount of work (cells to process) for any possible spatial distribution of edited cells. This fact is a key component for the efficient load balancing of multi-GPU configurations. The developed implementation actually divides cells based on an estimation of a device performance for improving load balancing of systems that have multiple different GPUs.

Every cell contains the complete information required for cell editing or rendering and can be processed completely independent from other cells. It is required for better scalability since each computing device needs to store only a subset of all cells and does not need information from other cells. It significantly reduces traffic between host and GPUs since each GPU has all required information in its own memory.

During a milling simulation the simulator processes a sequence of tool movements. Each tool movement is represented as a set of geometric primitives and each GPU calculates if there are cells intersecting one or more of these primitives. Generally each GPU performs a set of geometric tests in order to determine if a cell is intersected or hovered by a tool movement swept volume. If a cell lies completely inside of a tool swept volume, it is marked as an empty cell and its subcells node is released (if it was a boundary cell). If a cell is intersected by one or more tool swept volumes it is added to a list of cells that have to be further processed.

The second part of the material removing algorithm is the processing of subcells. During processing cells each GPU generates a list of cells intersected by a swept volume. This list is used for selecting subcells that have to be further processed. The algorithms performs the same set of geometric tests to each subcell and determines if a subcell is completely inside of a swept volume, completely outside or interested. Subcells that lie completely inside of a swept volume are marked as empty. Subcells intersected by a swept volume are marked as boundary if they were completely full by material.

Although the subcells value updating algorithm is relatively simple and straight forward, it is important to notice some GPU-specific implementation details. Each cell contains an array of 16×16×16 subcells and each subcell is represented by 2 bits. The selection of these parameters is critical since they determine both performance and memory efficiency. Each block of subcells may be processed independently for decreasing data exchange and eliminating additional synchronization without any memory access barriers for improved performance. This may result in perfectly linear and efficient memory reading and writing operations which are extremely important due to GPU memory controller limitations. This is possible because all of the subcells are independent from each other and their values can be updated in private memory of a thread that processes a subcell.

An exemplary embodiment of the present invention will now be described in reference to FIGS. 6-8. A hybrid dynamic tree data structure provides a means for representing volumes of geometry digitally and in an efficient manner for parallel processing available on graphical processing units. The hybrid dynamic tree treats a three dimensional box of space as composed of individual small cubes. The techniques used by the hybrid dynamic tree to economize the computer memory required to model volume in this way is unique. The hybrid dynamic tree breaks the box of space down into coarse resolution cubes.

As an example, FIG. 6 shows a complex shape 300 that may be modeled according to an example embodiment. FIG. 7A identifies a cross-section of the complex shape 300 which will be used hereinafter for explanatory purposes. FIG. 7B illustrates a cross section of the complex shape of FIG. 6 divided into cells and subcells in accordance with an example embodiment. In this regard, the 2-dimensional cross-section volume is divided into a plurality of similarly sized portions—e.g., cubes 42 in FIG. 7B. Each cube 42 can have one of four states:

1. Empty—The cube is completely outside the shape being represented.
2. Full—The cube is completely inside the shape being represented.
3. Branch—The cube is split into eight equal child cubes.
4. Boundary—The cube is split into a large number of individual cells.

States 1 and 2 are simple to understand. Empty means the cube is empty. Full means the cube if full. State 3 is shown in the figures where the cross-section of the structure shows the splitting of larger squares into four smaller squares. As can be seen in the cross-section view of FIG. 7B, the subdividing of the square is actually the subdividing of a cube in three dimensions into eight smaller cubes. State 4 indicates that subdividing into eight equal parts will end and a final subdivision into sixteen by sixteen by sixteen calls will be done in this cube. The four states may be stored using 2 bits of computer memory.

In the illustrated embodiment, for example, cube 44 would be identified as empty and cube 46 would be identified as full. Cube 48, which is shown subdivided into 4 sub-cells in FIG. 7B, is neither empty nor full, and would therefore be identified as a branch cube. Each branch cube 48 is further processed in a manner similar to the parent cube—i.e., the branch cube 48 is identified as full, empty, or neither. If the branch cube 48 is identified as neither full nor empty, it is identified as a boundary cube 50, which is a further subdivided portion of the branch cube 48. FIG. 8 shows a close-up view of the boundary state cube in cross-section. The pixilated blocks represent boundary cubes 50 and show the divisions of this cube into smaller cubes of space.

The cubes are collected into memory pools such that they are gathered into contiguous blocks of computer memory. The ability to model 3D volume in a digital fashion while keeping memory requirements manageable. The memory pooling allows for efficient transfer of the description of the volume to different forms of memory such as transfer from CPU system random access memory (RAM) to GPU video random access memory (VRAM).

Tool path planning for multi-axis milling CNC machines is a complicated problem that requires knowledge of the material removing process, selecting multiple appropriate strategies and highly accurate calculations. A solution for the computational problem requires having enough computational performance and an ability to use available resources efficiently. At the time when further increasing of processors clock frequency is almost impossible, it is possible to address these requirements by supporting parallel processing and ability to use multiple cores, devices and even computers simultaneously. Although parallel processing itself is not a complicated idea, the parallelization of existing geometry processing algorithms and data structures is not a trivial process. In order to simplify this process, the hybrid dynamic tree data structure provides a fundamentally parallel geometry representation that moves parallelization complexity from an algorithm design level to a data structure design level. As a result, every algorithm that uses the described geometry representation can be easily parallelized.

After the hybrid dynamic tree data structure is created, such that an accurate geometry of the object to be machined is available, an accessibility mapping algorithm may be used to digitally determine the acceptable orientations of a cutting tool in a CNC machine tool during the machining process. For example, a contact point is a single location of the cutting tool as it moves through a cutting sequence on a part being cut to shape. The contact point must be rotated such that it is "accessible" where the tool can reach the point without contacting material of the part that should not be cut or other parts of the machine tool that should not be cut. An "accessible" orientation will not cut material that should not be cut.

Machining a solid object to a desired geometry using a 5-axis CNC machine first requires a tool center trajectory to be defined. However, a tool center trajectory is only a part of a tool path for 5-axis machines since there is a need for a valid tool orientation at each point. Tool orientation selection depends heavily on a concept of accessibility map that represents all collision- and gouge-free orientations for a given tool center position. The set of orientations is represented as a two-dimensional array of one bit values where 0 indicates no access and 1 represents access, thereby defining where the tool can reach without colliding with material not intended for cutting. The rows of the array vary the tool orientation about one axis and the columns vary the tool orientations in an orthogonal axis. Thus, an accessibility map is stored as a bitmap where each pixel represents two rotary axis coordinates and has a value of 0 if this is a valid orientation or value 1 if this orientation results in collision.

A description of a highly parallel efficient algorithm for accessibility map calculation for a given point and a given tool/holder combination is provided below. Since there are infinite possible tool orientations, selection of tool orientation can be viewed as an optimization process with constraints represented by accessibility maps and a selected optimization criteria that represent desired orientation properties. The developed approach is based on the idea of using inaccessibility cones calculated for each geometry model element independently. Considering the fact that the developed geometry representation uses a set of spherical cells for representing a volume, it is possible to say that a valid orientation is an orientation that does not result in a collision with any of cells. So if it is possible to find all orientations that result into collision for each cell, all collision prone orientations will be described by a union of collision prone orientations of each cell and all collision free orientation will be described by a complement of that union. Independence of cells and their collision prone orientation also allows calculation of these orientations in parallel which is an important property for this work. An interesting part here is the calculation of inaccessible orientations for a spherical cell and a given tool and tool holder combinations. It is easy to see that for a fixed tool center position and a given spherical cell, a tool may come to a cell as close as possible until their surfaces touch each other. It is also possible to calculate the angle between a tool orientation and a vector from tool center to a sphere center.

FIG. 9 describes this approach where the dot 310 on top of the head corresponds with the location of the cutting tool. Associated with this location is an accessibility map as shown. The cutting tool 320 is depicted rotating with a theta and phi angle around axes. The image has phi on the y axis and theta on the x axis. The white area 330 in the image shows where the tool can make contact with the model without cutting material is should not cut. The black area 340 in the image shows where the tool cannot cut the model without cutting material it should not. The white area is the "accessible" orientations for the tool and the black area is the "inaccessible" area.

FIG. 10 shows the results of the current implementation of this algorithm using 3D graphics. The solid block 350 is the target shape to be created. The image in the upper left is the accessibility map 360 for the current point on the path of the cutting tool. The dot 370 on this image is the selected orientation for the tool and is firmly placed in the accessible area of the accessibility map so the tool will not collide with material it should not cut. The cutting tool 380 shows how the cutting tool will be oriented based on this dot in the accessibility map.

The basic algorithm for generating an accessibility map is as follows:
1. For a point where a cutting tool will be placed.
2. Define an image with N rows and M columns where each row is a rotation about the y-axis and each column is a rotation about the z-axis.
3. For each entry in this image, define a rotation value for the cutting tool.
4. Using a hybrid dynamic tree volume, test the geometry of the cutting tool against the box geometry for each element and cell of the hybrid dynamic tree volume.
5. If the cutting tool overlaps the box from 4, mark the entry in the image as inaccessible.
6. Otherwise, mark the entry as accessible.
7. End for from 3

Thus, the algorithm is used in generating cutting tool paths for computer numerically controlled machine tools. Specifically, the algorithm provides knowledge of which orientation angles are allowable for a given tool position. The algorithm allows determination of orientations of computer numerically controlled machines tools and subsequent writing of G-code files used by such machine tools. The algorithm is treats determining the valid orientations of cutting tools as a discrete function of fixed orientations rather than a continuous function. Subsequent use of these maps allows applying various optimizations to tool orientation while still preventing unwanted collisions. Furthermore, the algorithm is well suited for parallel processing algorithms. The developed accessibility map calculation approach has shown great parallelizability and scalability as well as a good performance.

Presented above is a design methodology for a highly parallel algorithm and a set of tool path planning algorithms developed by following the methodology. These algorithms include a solution for common computational geometry problems, such as offset surface calculation or volume surface intersections and a set of robust algorithm for multi-axis tool path planning used in CNC milling. Following the design methodology and using the developed highly parallel geometry representation have resulted in high parallelizability and scalability of these algorithms. As a result, they can efficiently run on multi-GPU systems with more than a thousand cores.

From a technical perspective, the modeling manager 44 described above may be used to support some or all of the operations described above. As such, the platform described in FIG. 1 may be used to facilitate the implementation of several computer program and/or network communication based interactions. As an example, FIG. 11 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal and executed by a processor in the user terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method of modeling a solid shape in a volume of space according to one embodiment of the invention, as shown in FIG. 11, may include segmenting the volume into a plurality of equal portions of a given first size at operation 400, and determining, with respect to each portion, a first fill status based on whether each respective portion includes material of the shape at operation 410. The method may further include segmenting selected portions of the volume, based on the first fill status, into equal portions of a given second size that is smaller than the first size at operation 420 and determining, with respect to each selected portion, a second fill status at operation 430. The method may further include segmenting second selected portions of the volume, based on the second fill status, into equal portions of a given third size that is smaller than the second size at operation 440 and determining, with respect to each second selected portion, a third fill status at operation 450. The method may also include generating a hybrid dynamic tree data structure based on the based on the first, second and third fill statuses at operation 460.

In some cases, determining the first, second and third fill statuses may include classifying respective ones of the volumes of the give first, second and third sizes as being completely empty of material of the shape, completely full or partially filled. In an example embodiment, segmenting selected portions may include segmenting only partially filled portions of the first size, and segmenting second selected portions may include segmenting only partially filled portions of the second size. In an example embodiment, segmenting selected portions of the volume into equal portions of the given second size may include segmenting the volume into segments that are ¼ of the given first size (in 2D) and ⅛ of the given first size (in 3D), and segmenting second selected portions of the volume into equal portions of the given third size may include segmenting the volume into segments that are ⅛ of the given first size (in 2D) and ¹⁄₆₄ of the given first size (in 3D). In some cases, the method may further include storing the hybrid dynamic tree data structure in contiguous blocks of computer memory. In some cases, the method may further include transferring the stored hybrid dynamic tree data structure from CPU random access memory (RAM) to GPU video RAM (VRAM). In an example embodiment, the method may further include employing the hybrid dynamic tree data structure relative to driving a numerically controlled machine cutting tool.

In an example embodiment, an apparatus for performing the method of FIG. 11 above may comprise a processor (e.g., the processor 52) or processing circuitry configured to perform some or each of the operations (400-460) described above. The processor may, for example, be configured to perform the operations (400-460) by performing hardware implemented logical functions, executing stored instructions, or executing algorithms for performing each of the operations. In some embodiments, the processor or processing circuitry may be further configured for additional operations or optional modifications to operations 400 to 460.

In another example embodiment, a method for generating a cutting tool path for a computer numerically controlled machine cutting tool according to one embodiment of the invention, as shown in FIG. 12, is provided. The method may include defining an accessibility map which defines, for a given cutting tool location, acceptable orientations of the cutting tool at operation 500, and employing the accessibility map to guide the cutting tool based on a determination of acceptable orientations of the cutting tool as a discrete function of fixed orientations at operation 510.

In an example embodiment, defining the accessibility map may include defining an image with N rows and M columns where each row is a rotation about a first axis and each column is a rotation about a second axis, defining a rotation value of the cutting tool for each entry of the image, employing a hybrid dynamic tree volume to test a geometry of the cutting tool against a box geometry for each element and cell of the hybrid dynamic tree volume, and making an accessibility determination based on results of the test. In some cases, making the accessibility determination may include marking the entry in the image as inaccessible if the cutting tool overlaps with a box, and otherwise marking the entry as accessible. In an example embodiment, the accessibility map may define a bitmap where each pixel represents two rotary axis coordinates and has a value of 0 for a valid orientation or a value 1 for an orientation that results in collision.

In an example embodiment, an apparatus for performing the method of FIG. 11 above may comprise a processor (e.g., the processor 52) or processing circuitry configured to perform some or each of the operations (500-510) described above. The processor may, for example, be configured to perform the operations (500-510) by performing hardware implemented logical functions, executing stored instructions, or executing algorithms for performing each of the operations. In some embodiments, the processor or processing circuitry may be further configured for additional operations or optional modifications to operations 500 to 510.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A method for generating a cutting tool path for a computer numerically controlled machine cutting tool, the method comprising:
    segmenting the volume into a plurality of equal portions of a given first size;
    determining, with respect to each portion, a first fill status based on whether each respective portion includes material of the shape;
    segmenting selected portions of the volume, based on the first fill status, into equal portions of a given second size that is smaller than the first size;
    determining, with respect to each of the selected portions segmented into the equal portions of the given second size, a second fill status;
    segmenting second selected portions of the volume, based on the second fill status, into equal portions of a given third size that is smaller than the second size;
    determining, with respect to each of the second selected portions segmented into the equal portions of the given third size, a third fill status; and
    generating a hybrid dynamic tree data structure based on the first, second and third fill statuses;
    employing the hybrid dynamic tree data structure relative to driving the computer numerically controlled machine cutting tool according to an accessibility map, wherein the accessibility map defines orientations of the computer numerically controlled machine cutting tool to avoid collision with material not intended for cutting at each respective location of a cutting tool map;
    wherein defining the accessibility map comprises:
        defining an image with N rows and M columns where each row is a rotation about a first axis and each column is a rotation about a second axis; and
        defining a rotation value of the cutting tool for each entry of the image;
        employing a hybrid dynamic tree volume to test a geometry of the cutting tool against a box geometry for each element and cell of the hybrid dynamic tree volume; and
        making an accessibility determination based on results of the test, wherein the accessibility determination comprises making the entry in the image as inaccessible if the cutting tool overlaps with a box, and otherwise making the entry as accessible; and
    wherein the accessibility map further defines a bitmap where each pixel represents two rotary axis coordinates and has a value of 0 for a valid orientation or a value of 1 for an orientation that results in collision.

2. The method of claim 1, wherein determining the first, second and third fill statuses comprises classifying respective ones of the volumes of the given first, second and third sizes as being completely empty of material of the shape, completely full or partially filled.

3. The method of claim 2, wherein segmenting selected portions comprises segmenting only partially filled portions of the first size, and wherein segmenting second selected portions comprises segmenting only partially filled portions of the second size.

4. The method of claim 3, wherein segmenting selected portions of the volume into equal portions of the given second size comprises segmenting the volume into segments that are ⅛ of the given first size.

5. The method of claim 3, wherein segmenting second selected portions of the volume into equal portions of the given third size comprises segmenting the volume into segments that are 1/64 of the given first size.

6. The method of claim 3, wherein segmenting selected portions of the volume into equal portions of the given second size comprises segmenting the volume into segments that are ⅛ of the given first size, and wherein segmenting second selected portions of the volume into equal portions of the given third size comprises segmenting the volume into segments that are 1/64 of the given first size.

7. The method of claim 6, further comprising storing the hybrid dynamic tree data structure in contiguous blocks of computer memory.

8. The method of claim 7, further comprising transferring the stored hybrid dynamic tree data structure from CPU random access memory (RAM) to GPU video RAM (VRAM).

9. The method of claim 1, wherein generating the hybrid dynamic tree data structure comprises representing volume via analytic data representation for storage such that the hybrid dynamic tree data structure is dynamically generated via a three dimensional bitmap.

10. An apparatus comprising processing circuitry configured for generating a cutting tool path for a computer numerically controlled machine cutting tool, the processing circuitry being configured by executing operations comprising:

segmenting the volume into a plurality of equal portions of a given first size;

determining, with respect to each portion, a first fill status based on whether each respective portion includes material of the shape;

segmenting selected portions of the volume, based on the first fill status, into equal portions of a given second size that is smaller than the first size;

determining, with respect to each of the selected portions segmented into the equal portions of the given second size, a second fill status;

segmenting second selected portions of the volume, based on the second fill status, into equal portions of a given third size that is smaller than the second size;

determining, with respect to each of the second selected portions segmented into the equal portions of the given third size, a third fill status; and generating a hybrid dynamic tree data structure based on the first, second and third fill statuses;

employing the hybrid dynamic tree data structure relative to driving the computer numerically controlled machine cutting tool according to an accessibility map, wherein the accessibility map defines orientations of the computer numerically controlled machine cutting tool to avoid collision with material not intended for cutting at each respective location of a cutting tool map;

wherein defining the accessibility map comprises:

defining an image with N rows and M columns where each row is a rotation about a first axis and each column is a rotation about a second axis; and defining a rotation value of the cutting tool for each entry of the image;

employing a hybrid dynamic tree volume to test a geometry of the cutting tool against a box geometry for each element and cell of the hybrid dynamic tree volume; and making an accessibility determination based on results of the test, wherein the accessibility determination comprises making the entry in the image as inaccessible if the cutting tool overlaps with a box, and otherwise making the entry as accessible; and wherein the accessibility map further defines a bitmap where each pixel represents two rotary axis coordinates and has a value of 0 for a valid orientation or a value of 1 for an orientation that results in collision.

11. The apparatus of claim 10, wherein the processing circuitry is configured for determining the first, second and third fill statuses by classifying respective ones of the volumes of the given first, second and third sizes as being completely empty of material of the shape, completely full or partially filled.

12. The apparatus of claim 11, wherein the processing circuitry is configured for segmenting selected portions by segmenting only partially filled portions of the first size, and wherein segmenting second selected portions comprises segmenting only partially filled portions of the second size.

13. The apparatus of claim 12, wherein the processing circuitry is configured for:

segmenting selected portions of the volume into equal portions of the given second size by segmenting the volume into segments that are ⅛ of the given first size, and segmenting second selected portions of the volume into equal portions of the given third size by segmenting the volume into segments that are 1/64 of the given first size.

14. The apparatus of claim 13, wherein the processing circuitry is further configured for storing the hybrid dynamic tree data structure in contiguous blocks of computer memory.

\* \* \* \* \*